(12) United States Patent
Knoop et al.

(10) Patent No.: US 11,203,656 B2
(45) Date of Patent: Dec. 21, 2021

(54) METHOD FOR PRODUCING THERMALLY STABLE MELT-SPINNABLE PAN COPOLYMERS, PAN COPOLYMERS, MOLDED BODIES MADE THEREOF, AND A METHOD FOR PRODUCING SAID MOLDED BODIES

(71) Applicant: FRAUNHOFER-GESELLSCHAFT ZUR FÖRDERUNG DER ANGEWANDTEN FORSCHUNG E. V., Munich (DE)

(72) Inventors: Mats Timothy Knoop, Potsdam (DE); Antje Lieske, Potsdam (DE); Mathias Hahn, Michendorf (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 794 days.

(21) Appl. No.: 15/775,213

(22) PCT Filed: Oct. 27, 2016

(86) PCT No.: PCT/EP2016/075950
§ 371 (c)(1),
(2) Date: May 10, 2018

(87) PCT Pub. No.: WO2017/084853
PCT Pub. Date: May 26, 2017

(65) Prior Publication Data
US 2020/0291158 A1    Sep. 17, 2020

(30) Foreign Application Priority Data

Nov. 16, 2015  (DE) .................... 10 2015 222 585.2

(51) Int. Cl.
| | |
|---|---|
| *C08F 222/30* | (2006.01) |
| *D01D 5/08* | (2006.01) |
| *D01F 6/38* | (2006.01) |
| *D01F 9/22* | (2006.01) |
| *C08F 220/44* | (2006.01) |

(52) U.S. Cl.
CPC .......... *C08F 222/30* (2013.01); *C08F 220/44* (2013.01); *D01D 5/08* (2013.01); *D01F 6/38* (2013.01); *D01F 9/22* (2013.01)

(58) Field of Classification Search
CPC ....... C08F 222/30; C08F 220/44; D01D 5/08; D01F 6/38; D01F 9/22
USPC ...................................................... 526/342
See application file for complete search history.

(56) References Cited

U.S. PATENT DOCUMENTS

| | | | |
|---|---|---|---|
| 3,499,073 A | 3/1970 | Sun et al. | |
| 4,062,857 A * | 12/1977 | Kobashi | ............... C08F 220/44 524/831 |
| 4,107,252 A | 8/1978 | Richmond | |
| 4,163,770 A | 8/1979 | Porosoff | |
| 4,237,256 A * | 12/1980 | Kobashi | ................. C08F 20/44 524/827 |
| 4,238,442 A | 12/1980 | Cline et al. | |
| 5,356,985 A | 10/1994 | Sackmann et al. | |
| 5,618,901 A | 4/1997 | Smierciak et al. | |
| 6,114,034 A | 9/2000 | Jorkasky, II et al. | |
| 7,786,190 B2 | 8/2010 | Hahn et al. | |
| 8,501,146 B2 * | 8/2013 | Choi | ........................ D01F 1/02 423/447.1 |
| 2007/0270529 A1 | 11/2007 | Lutzmann et al. | |
| 2012/0027944 A1 | 2/2012 | Yu et al. | |
| 2013/0133819 A1 * | 5/2013 | Choi | ........................ D01F 1/02 156/245 |
| 2017/0275405 A1 | 9/2017 | Hahn et al. | |
| 2017/0298539 A1 | 10/2017 | Hahn et al. | |
| 2019/0100856 A1 | 4/2019 | Knoop et al. | |

FOREIGN PATENT DOCUMENTS

| | | |
|---|---|---|
| DE | 102014219707 A1 | 3/2016 |
| EP | 0 030 666 A2 | 6/1981 |
| EP | 0 406 709 A2 | 1/1991 |
| GB | 663 268 A | 12/1951 |
| GB | 663228 * | 12/1951 |
| GB | 663268 * | 12/1951 |
| GB | 1 270 504 A | 4/1972 |
| GB | 2 356 830 A | 6/2001 |
| JP | H06-206916 A | 7/1994 |
| JP | H09-512587 A | 12/1997 |

(Continued)

OTHER PUBLICATIONS

Japan Patent Office, Notice of Reasons for Refusal in Japanese Patent Application No. 2018-525470 (dated Jun. 16, 2020).

(Continued)

*Primary Examiner* — Michael M. Bernshteyn
(74) *Attorney, Agent, or Firm* — Leydig, Voit & Mayer, Ltd.

(57) ABSTRACT

The invention relates to a novel synthesis process in order to produce meltable PAN copolymers with increased thermal stability. The PAN copolymers produced using the method according to the invention surprisingly exhibit improved thermal and mechanical properties compared to PAN copolymers produced using methods known from the prior art. The invention additionally relates to corresponding PAN copolymers and to molded bodies produced therefrom or to a method for producing such molded bodies, in particular melt-spun mono- or mufti-filaments.

13 Claims, 8 Drawing Sheets

(56) References Cited

FOREIGN PATENT DOCUMENTS

WO      WO 00/50675 A1    8/2000

OTHER PUBLICATIONS

Bhanu et al., "Synthesis and characterization of acrylonitrile methyl acrylate statistical copolymers as melt processable carbon fiber precursors," *Polymer* 43(18): 4841-4850 (2002).
Japan Patent Office, Notice of Reasons for Refusal in Japanese Patent Application No. 2018-525470 (dated Oct. 20, 2020).
European Patent Office, International Search Report in International Application No. PCT/EP2016/075950 (dated Jan. 24, 2017).
European Patent Office, Written Opinion in International Application No. PCT/EP2016/075950 (dated Jan. 24, 2017).
International Bureau of WIPO, International Preliminary Report on Patentability (Chapter I) in International Application No. PCT/EP2016/075950 (dated May 22, 2018).

\* cited by examiner

METHOD FOR PRODUCING THERMALLY STABLE MELT-SPINNABLE PAN COPOLYMERS, PAN COPOLYMERS, MOLDED BODIES MADE THEREOF, AND A METHOD FOR PRODUCING SAID MOLDED BODIES

CROSS-REFERENCE TO RELATED APPLICATIONS

This patent application is the U.S. national phase of International Application No. PCT/EP2016/075950, filed on Oct. 27, 2016, which claims the benefit of German Patent Application No. 10 2015 222 585.2, filed Nov. 16, 2015, the disclosures of which are incorporated herein by reference in their entireties for all purposes.

The present invention relates to a new synthesis process for producing meltable PAN copolymers with increased thermal stability. The PAN copolymers produced according to the method according to the invention surprisingly display improved thermal and mechanical properties compared with PAN copolymers produced according to methods known from the state of the art. In addition, the present invention relates to corresponding PAN copolymers and also moulded articles produced therefrom or to a production method for the production of such moulded articles, in particular melt-spun mono- or multifilaments.

Carbon fibres are produced, according to the state of the art, by thermal conversion of separately produced precursor fibres. Materials for the precursor fibres are above all PAN (co)polymers (acrylic precursor) and also pitch. Acrylic precursor fibres have been produced commercially to date exclusively via wet- or dry-spinning methods. For this purpose, a solution of the polymers with concentrations ≤20% is spun either in a coagulation bath or a hot steam atmosphere, the solvent diffusing out of the fibre. In this way, qualitatively high-value precursors are produced, however the costs of the methods are comparatively high. This results, on the one hand, from the required solvents and the handling thereof, on the other hand, from the relatively low throughput of solution spinning methods.

Because of the strong inter- and intramolecular interactions of the nitrile groups, the melting point of PAN at 320° C. is above the decomposition temperature of the polymer. This means that melt-spinning of pure PAN is not possible, the polymer does not behave like a thermoplastic but rather like a duroplastic. At the same time however, the possibility for production of precursor fibres by means of melt-spinning would imply a significant saving in costs in the precursor production since the throughput in the case of melt-spinning is substantially higher and in addition no solvents, which create costs for obtaining and recycling/disposal, are necessary.

There have therefore been attempts for several decades to make PAN accessible to processing by means of melt-spinning. In principle, there should thereby be differentiated approaches via external plasticising (mixture of the polymer with additives) and internal plasticising (copolymerisation). In both cases, the interaction of the nitrile groups is thereby disrupted so that melting below the decomposition temperature of the polymer is effected.

External Plasticising:

US 2012/0027944 A1 describes the use of ionic liquids in mass ratios of 1:1 to 1:0.25 for external plasticising of PAN homopolymers. US 2007/0270529 A1 describes the blending of PAN with aromatic commercial thermoplastics with the addition of compatibilisers and thermal stabilisers. In both cases, the polymer, after melt-spinning, comprises in addition the external plasticisers so that a qualitatively lower-value precursor fibre and a decrease in the carbon yield during carbonisation are unavoidable. Various patents (for example EP 0406709 A2; U.S. Pat. Nos. 4,238,442; 4,163,770) describe the use of water as external plasticiser, either alone or in combination with other solvents, such as nitroalkanes, glycols etc. For processing of such plasticised PANs by means of melt-spinning, special melt-spinning apparatus is required, in which the fibre is spun in a pressure zone in order firstly to enable fibre formation; during the subsequent pressure-release, the water evaporates in a controlled manner. Because of the requirements with respect to apparatus, this method can be used only with significant expenditure, in addition the evaporating water or solvent leads inevitably to porous fibre structures since proportions of at least 30% of external plasticiser are required.

Internal Plasticising:

Internal plasticising is achieved by copolymerisation with suitable comonomers. Already in 1970, the production of thermoplastic acrylonitrile copolymers for fibre production by means of melt-spinning was described in GB1270504. 8-50% by weight of aliphatic/alicyclic alkenes and/or acrylates and 0.2-10% by weight of sulphonic acid group-containing monomers are thereby mentioned as comonomers. Textile fibres are referred to as application field. In the application examples, methyl-, ethyl-, butyl acrylate, isobutene, vinyl acetate and propene are listed as comonomers; the spinning temperature at the nozzle was at 200 to 240° C. Such acid group-containing copolymers are however not suitable for a continuous melt-spinning method since the melt viscosity is not stable but rather, in the course of time, increases inevitably because of the cyclisation reaction of the nitrile groups, catalysed by the acid groups. In U.S. Pat. No. 3,499,073, the production of thermoplastic PAN copolymers with the help of an organometallic catalyst is described. The polymers—also homopolymers of PAN—could be processed to form monofilaments at temperatures of 250° C. to 295° C. GB1294044 describes acrylonitrile copolymers which comprise 60-70% acrylonitrile, 25-30% methacrylonitrile and 5-10% acrylates or methacrylates and have softening points between 125° C. and 175° C. At the described softening point, the polymer is however present not as a melt but as a flexiblised film. In U.S. Pat. No. 4,107,252, copolymers of acrylonitrile with 12-18% by weight of styrene and 13-18% by weight of isobutene, which have melting temperatures between 175° C. and 260° C., are presented. The comonomer contents are however much too high to be able to produce carbon fibres from such copolymers. In general, it is assumed that a PAN copolymer suitable for carbon fibres must comprise an average chain length of 9 successive acrylonitrile units. Therefore realistically, only approx. 10% by mol of comonomer content can be tolerated. In EP0030666, thermoplastic acrylonitrile copolymers with an acrylonitrile content up to 96% for hoses and films are described which are produced by grafting of acrylonitrile on an elastomer phase. Such polymers, because of the grafting, have branched structures and are not suitable for fibre production. GB 2356830 describes the thermoplastic deformation of acrylonitrile polymers with 96-100% acrylonitrile content by a special pressure- and temperature regime, however the author excludes the possibility for use for melt-spinning because of the required high extruder pressures.

The most extensive patents relating to internal plasticising are held by Standard Oil. U.S. Pat. No. 5,618,901 describes thermoplastic acrylonitrile copolymers consisting of 50-95% acrylonitrile and 5-50% of a comonomer, firstly all conceivable comonomer classes (acrylates, methacrylates, acrylamides, methacrylamides, acrylamide derivatives, methacrylamide derivatives, vinyl esters, vinyl ethers, vinyl amides, vinyl ketones, styrene, halogen-containing monomers, ionic monomers, acid group-containing monomers, amino group-containing monomers, olefins and combinations) being covered. The embodiments indicate methyl styrene, styrene, vinyl acetate, methyl acrylate and methyl methacrylate with at least 15% by weight proportion (corresponds for methyl acrylate to approx. 10% by mol) of copolymer. The copolymers could be extruded at 200° C. U.S. Pat. No. 6,114,034 describes the production of fibres from precisely these copolymers, exclusively methyl acrylate and vinyl acetate being used as comonomers in the embodiments, and in fact in a proportion of 15-25% by weight. Fibres could be produced with diameters of 3-8 dtex and strengths up to 29 cN/tex (15% methyl acrylate) or 55 cN/tex (25% methyl acrylate), the spinning temperatures were, as a function of the molar mass, between 210° C. (55,000 g/mol) and 240° C. (90,000 g/mol). In WO 00/50675, the use of the above-described copolymers for the production of carbon fibre precursors is disclosed. However, the patent content does not extend beyond U.S. Pat. No. 6,114,034. As preferred comonomers, methyl acrylate, ethyl acrylate, methyl methacrylate and vinyl acetate are indicated.

U.S. Pat. No. 5,618,901, mentioned already above, claims a process for the production of melt-spinnable PAN copolymers, a so-called "starved feed" polymerisation process. Such a process is characterised in that the monomer mixture is metered in over the reaction time and in fact at a speed which is the polymerisation speed of the system (see claim 1: "wherein the rate of addition of the multimonomer feed mixture is less than or equal to the rate of polymerization").

The reaction speed of such a method is thereby never increasing, this is also revealed with reference to the observed heat flow which can thereby remain at most constant, but never increasing. All of the metered monomer always therefore reacts immediately, no monomer enrichment takes place in the system and the reaction speed remains constant over the metering time. The background presented in the patent for this procedure is that, with such a starved feed process, the copolymers have a composition distribution which enables a high thermal stability under thermoplastic processing conditions.

However, some works show that copolymers produced analogously to this patent under thermal load have no stable melt viscosity, but rather the melt viscosity increases because of crosslinking phenomena, as is shown subsequently in the comparative examples. This is likewise verified by the scientific literature (Bhanu et al.; Polymer 43 (2002) 4841-4850). The thermal stability of the melt-spinnable copolymers is however the crucial criterion for a technically implementable melt-spinning process. Thermal instability, as the PAN copolymers produced according to U.S. Pat. No. 5,618,901 have, prevents a long-term-stable spinning process. It leads to cracks at hot spots in the spinning extruder, in the spinning pump and in the spinning nozzle and to defects in the spun fibre. A melt-spinnable PAN precursor should have at most 11% by mol of comonomer, be processible at temperatures <240° C. by means of melt spinning and also have high thermal stability at and above the processing temperature in order to be able to tolerate temperature peaks due to mechanical loading in the spinning extruder and spinning pump.

A material improvement in the portrayed situation is provided already by the patent application DE 10 2014 219 707.4. Instead of the above-mentioned comonomers, here alkoxy alkyl acrylates are used as comonomers, it being able to be shown that such PAN copolymers have improved thermal stability under processing conditions.

In addition to the material basis, the process control of the polymerisation and, resulting therefrom, the stochastics of the composition in the copolymer likewise have a crucial influence on the thermal stability of the PAN copolymers, as U.S. Pat. No. 5,618,901 rightly establishes.

However it is still desirable to find synthesis methods with which the thermal stability of PAN copolymers can be further improved so that such copolymers are suitable in particular also for melt-spinning.

This object is achieved, with respect to a method for the production of PAN copolymers, and with respect to a correspondingly produced PAN copolymer. Moulded articles which consist of the PAN copolymers produced according to the invention are described, as well as a production method for the production of moulded articles according to the invention, and advantages of the invention are described.

The present invention hence relates to a method for the production of PAN copolymers by radical copolymerisation of at least one acrylonitrile monomer and at least one radically polymerisable comonomer, in which an initial mixture comprising at least one acrylonitrile monomer and at least one radically polymerisable comonomer is present, a radical polymerisation reaction is initiated, wherein, before, during and/or after initiation, a mixture comprising the at least one acrylonitrile monomer and the at least one radically polymerisable comonomer are added into the initial mixture so that the reaction speed of the radical polymerisation reaction and/or the heat flow released during the radical polymerisation is continuously increasing at least at times over the entire period of time of the metered addition, however is never decreasing.

DETAILED DESCRIPTION OF THE INVENTION

According to the present invention, an initial mixture of at least one acrylonitrile monomer and at least one radically polymerisable comonomer which can react with the acrylonitrile monomer is present.

A radical polymerisation reaction is initiated. Before, during and/or after initiation of the radical polymerisation reaction, a mixture, which comprises further radically polymerisable monomers, is added to the reaction mixture.

It is essential in the present invention that the course of the reaction is controlled such that, at least at times or preferably during the entire metered addition of further radically polymerisable monomers to the reaction mixture, a slight increase in speed of the reaction is always provided. This can also be expressed for example in the fact that the released heat flow is increasing during the radical polymerisation.

According to the invention, the increase is continuously increasing at least at times, but never decreasing. The reaction speed or the released heat flow can thereby hence stagnate, also at least at times, during the metered addition of the further mixture.

Surprisingly, it could be established that, with the method according to the invention, in particular in comparison to the method control presented by U.S. Pat. No. 5,618,901, PAN copolymers can be obtained which—although of the same chemical constitution—have a significantly improved thermal stability, a significantly improved thermal processibility and a significantly lesser tendency toward thermal decomposition. In total, the PAN copolymers producible according to the invention can hence be described as significantly more stable.

The method according to the invention enables, entirely surprisingly, the production of PAN copolymers which are thermoplastically processible at comparatively low temperatures, associated with relatively low melt viscosities and also very high thermal stability of the melt.

Thermoplastically processible PAN can, inter alia, be processed, in comparison with solution spinning, by significantly more efficient and economical melt-spinning, to form fibres. In the case of thermoplastic processing and above all in the case of the melt-spinning process, the result is not decomposition and crosslinking processes. The melt has constant properties over time which allow reproducible and qualitatively high-value spinning and processing.

The copolymers according to the invention can be used for the production of precursor fibres for C-fibres and also for the production of commercial acrylic fibres, both by means of melt-spinning. In addition, thermoplastic PAN is usable possibly also for the production of PAN moulded articles by means of thermoplastic processing methods, such as injection moulding, extrusion or 3D-printing.

According to a preferred embodiment, the reaction speed of the radical polymerisation reaction and/or the heat flow released during the radical polymerisation is continuously increasing over the entire period of time of the addition.

As an alternative hereto, it is likewise possible and preferred according to the invention that the reaction speed or the released heat flow is continuously increasing, at least or precisely over a first part of the period of time of the addition and is kept constant in at least or precisely a further part, preferably the first part of the period of time constituting at least 30%, preferably at least 40% to 95%, particularly preferably 50% to 90%, of the total period of time of the addition.

According to this last-represented embodiment, in a temporally first part of the polymerisation reaction, an acceleration of the reaction speed, as illustrated above takes place, whilst the reaction in a further temporal part of the polymerisation process can be controlled such that a constancy of the reaction speed or of the release of the heat flow can be noted.

Independently of each other or in combination with each other, the initial mixture and/or the added mixture can comprise a) as acrylonitrile monomer, acrylonitrile, methacrylonitrile or mixtures hereof and/or b) as the at least one radically polymerisable comonomer, at least one alkoxy alkyl acrylate, alkyl acrylate, vinyl ester, styrene, substituted styrenes, such as methyl styrene, acrylamide, N-substituted acrylamides, N,N-annularly substituted acrylamides, N-substituted N-vinyl amides, N,N-annularly substituted N-vinyl amides, acid-containing monomers, such as acrylic acid, methacrylic acid, vinyl sulfonic acid, itaconic acid, ionic monomers, such as sodium vinyl sulfonate, sodium styrene sulfonate, sodium acrylate, sodium methacrylate or mixtures of at least two of the above-mentioned compounds or, with respect to the at least one acrylonitrile monomer and to the at least one radically polymerisable comonomer, consist hereof.

In particular, it is particularly preferred that the initial mixture and/or the metered-in mixture comprises
a) as acrylonitrile monomer, 95 to 80% by mol of acrylonitrile and also
b) as the at least one comonomer
   i) 5 to 20% by mol of at least one alkoxy alkyl acrylate of the general formula I with $R=C_nH_{2n+1}$ and $n=1-8$ and $m=1-8$, in particular $n=1-4$ and $m=1-4$,
   ii) 0 to 10% by mol of at least one alkyl acrylate of the general formula II with $R'=C_nH_{2n+1}$ and $n=1-18$, and
   iii) 0 to 10% by mol of at least one vinyl ester of the general formula III with $R=C_nH_{2n+1}$ and $n=1-18$ relative to the totality of acrylonitrile monomers and copolymers or, with respect to the at least one acrylonitrile monomer and to the at least one radically polymerisable comonomer, consists hereof.

The particularly preferred PAN copolymer systems, which have just been presented, are the subject of the German patent application DE 10 2014 219 707, the disclosure content of which, with respect to the PAN copolymers in the above-mentioned sense, is also made the subject, in its entirety, of the present patent application. All of the PAN copolymers presented there can also be used for the purposes of the present invention.

The present invention is not however restricted to the just-discussed PAN copolymers, for example also the PAN copolymers mentioned by U.S. Pat. No. 5,618,901 can be produced according to the method according to the invention. With respect to these copolymer systems, the disclosure content of U.S. Pat. No. 5,618,901 is also made the subject of the present invention and the disclosure, in this respect, is jointly included in the present application.

The initial mixture or the added mixture or both mixtures can comprise at least one solvent in which the species to be polymerised can be dissolved or dispersed.

Preferred solvents are hereby selected from the group consisting of water, alcohols or mixtures hereof, water being preferred in particular. When using water, organic solvents can hence be dispensed with.

According to a further preferred embodiment, the content of the solvent in the initial mixture is greater than the content of the solvent in the metered-in mixture.

In particular, it is preferred if the content of the solvent in the initial mixture is from 80 to 99.9% by weight, preferably from 90 to 98% by weight.

Furthermore it is preferred if the initial mixture and/or the metered-in mixture comprises at least one emulsifier, the at least one emulsifier preferably being selected from the group consisting of alkyl sulphonates, alkyl sulfates, aralkyl sulfonates, aralkyl carboxylates, acrylosulfonates, fatty acid soaps, resin soaps and/or being contained in quantities of 0.001 to 5% by weight, preferably 0.01 to 2.5% by weight, particularly preferably 0.1 to 1% by weight, respectively relative to the initial mixture or the metered-in mixture.

Furthermore, it is provided according to a further preferred embodiment that the initial mixture and/or the metered-in mixture comprises at least one chain-transferring substance, preferably the at least one chain-transferring substance being selected from the group consisting of mercaptans, in particular benzyl mercaptan, monofunctional alkyl mercaptans, multifunctional alkyl mercaptans, other organic sulfur compounds such as disulfides and also mixtures or combinations hereof and/or being contained in quantities of 0.001 to 2% by weight, preferably 0.01 to 1% by weight, particularly preferably 0.05 to 0.5% by weight, respectively relative to the initial mixture or the added mixture.

The polymerisation reaction can be initiated chemically, thermally or by means of irradiation, in particular chemically by the addition of a radical starter to the initial mixture and/or to the added mixture.

For particular preference, the added mixture is added separately into the initial mixture, a first part of the added mixture comprising the at least one acrylonitrile monomer which comprises at least one comonomer and at least one chain-transferring substance or consists hereof, and a second part comprising at least one solvent and at least one radical starter or consisting hereof. The first part of the added mixture is thereby preferably solvent-free, in particular free of water.

The reaction can be conducted for example at temperatures of 30 to 90° C., preferably of 50 to 80° C. For example the initial mixture or the reaction mixture produced during addition of the further mixture to the initial mixture is hereby temperature-controlled to the corresponding temperature. The temperature-control can be effected in fact before initiation of the polymerisation reaction, however it is likewise also possible that the reaction is started cold, i.e. for example is started starting from normal temperature.

It is hereby possible that the polymerisation is conducted isothermally, i.e. that the temperature of the reaction mixture is kept constant or essentially constant (i.e. within the framework of a tolerance of ±5° C. from a prescribed fixed temperature).

In particular, the radical polymerisation is conducted as emulsion polymerisation.

The subject of the present invention is likewise a polyacrylonitrile copolymer, producible according to a method according to one of the preceding claims.

Surprisingly, it was recognised that the PAN copolymers produced in the manner according to the invention have significantly better thermal resistance than otherwise chemically identical PAN copolymers which were produced according to methods from the state of the art.

The particular thermal stability can be established in particular by the sol-gel transition.

The sol-gel transition of the PAN copolymers according to the invention can be determined by means of a rheological oscillation experiment with a plate-plate configuration (diameter 20 mm, gap 0.5 mm) with a shear stress amplitude of 200 Pa, at a frequency of 1.6 Hz and a temperature of 235° C. The temporal courses of the storage modulus G' and of the loss modulus G" are hereby determined, the intersection of the storage modulus G' and of the loss modulus G" is determined as sol-gel transition and indicated in a temporal unit, for example seconds.

The PAN copolymers produced according to the invention are distinguished preferably by a sol-gel transition which is at least 30% greater, compared to an identical polyacrylonitrile copolymer, produced according to a starved-feed method. The method described according to U.S. Pat. No. 5,618,901 is hereby understood as starved-feed method. According to this parameter, PAN copolymers which were produced with the method according to the invention are more stable by at least 30% than chemically identical PAN copolymers which were produced according to the starved-feed method according to U.S. Pat. No. 5,618,901.

Alternatively or additionally for this purpose, the sol-gel transition occurs with the PAN copolymers according to the invention preferably after at least 1,200 s, preferably at least 1,500 s, further preferably at least 2,000 s, in particular at least 3,000 s.

In addition, moulded articles, obtainable from a polyacrylonitrile copolymer, in particular in the form of a mono- or multifilament, are the subject of the present invention. According to the invention, likewise a method for the production of a previously described moulded article is indicated, in which a PAN copolymer produced according to the invention is subjected to a shaping process, in particular in which the polyacrylonitrile copolymer is melt-spun and consequently a mono- or multifilament is produced.

The present invention has been described in more detail with reference to the subsequent embodiment without restricting the subject to the present invention.

According to the present invention, it was recognised that, in particular within an emulsion polymerisation process, a controlled deviation from the starved-feed regime produces PAN copolymers with far higher thermal stabilities and in addition leads to further improvements.

Deviation from the starved-feed process means that, in the initial phase of the polymerisation or over the entire process course, a successive monomer enrichment in the system and hence acceleration of the polymerisation over time is permitted. In a controlled manner, this can be achieved, within the scope of this invention, by either the metering time of the monomer being shortened, in comparison to a starved-feed process, and/or at the beginning of the polymerisation a relatively large quantity of a chain-transferring substance is present, which leads, in addition to control of the molar mass in large proportions, also to partial inhibition of the polymerisation.

A controlled deviation from the starved-feed regime means, on the other hand, that metering regimes and/or input quantity of the chain-transferring substance are chosen such that, in the course of the process, no peaks in the reaction speed result since such a reaction which is too rapid has a negative effect on the thermal stability of the copolymers and on the control of a commercial polymerisation process.

Figure 1:
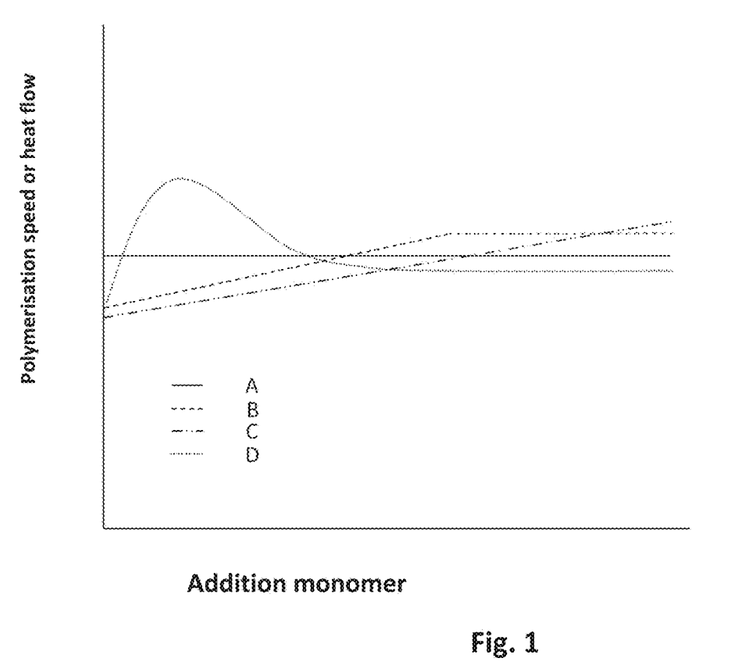
FIG. 1 depicts the polymerisation speeds or the heat flows of semi-batch emulsion polymerisations over the metering time of the monomer mixture. A corresponds to a starved-feed process, B and C correspond to processes according to the invention, and D corresponds to a reaction which is not according to the invention.

For illustration: in FIG. 1, polymerisation speeds or heat flows of semi-batch emulsion polymerisations over the metering time of the monomer mixture are plotted schematically. Case A corresponds to a starved-feed process, cases B and C to courses according to the invention and case D to a reaction which is not according to the invention since it is too rapid and in which in fact a constant increase in regions of the reaction speed can be observed, however also a decrease in the reaction speed in the further course.

The subject of the present invention is hence in particular a controlled semi-batch emulsion polymerisation process, which deviates from a starved-feed regime, for the production of melt-spinnable PAN copolymers, which can also be applied from a material point of view to the PAN copolymers covered in DE 10 2014 219 707.4 and the PAN copolymer classes covered by U.S. Pat. No. 5,618,901, as the embodiments show. The material basis, with respect to composition and molar mass, cited in DE 10 2014 219 707.4, is preferred.

It was found that PAN copolymers, which were produced corresponding to the process according to the invention, have, with the same molar mass and composition, in comparison to copolymers produced according to processes which are not according to the invention, lower melting points, lower melt viscosities and higher thermal stabilities. The PAN copolymers according to the invention can be processed by means of melt-spinning, the obtained fibres having good mechanical properties and degrees of orientation.

In the following application examples, the following methods for characterisation of the process and of the PAN copolymers are used:

The heat flow during the polymerisations serves as a measure of the course of the polymerisation and for differentiating the various process courses. Polymerisations are exothermal reactions, i.e. over the reaction course a heat quantity which is proportional to the conversion of the polymerisation is released.

This can be detected time-resolved by means of a reaction calorimeter. The device used here (RC1e by Mettler-Toledo) records heat flow trends in real time. Since this recording can be connected with sharp swings in the heat flows, at points, precisely in the case of reactions with metering-in of a reaction partner, the sliding average of the recorded values over respectively 50 measuring points is used for illustration in the corresponding graphics.

Processes according to the invention are distinguished by the thus recorded heat flow, which is proportional to the reaction speed, preferably increasing constantly (almost linearly) over the entire course or over the first phase of the monomer metered addition, without passing through a prominent maximum in the period of time of the monomer metered addition. Reactions not according to the invention are characterised in that the heat flow remains almost constant either during the monomer metered addition (extends parallel to the x-axis="starved feed"; comparative examples 1+2) or, in the opposite case, has a pronounced maximum (comparative example 3; standard course of an emulsion polymerisation):

Characterisation of the composition via $^1$H-NMR

Comparative determination of a characteristic number of the molar mass via the measurement of the relative viscosity of a 1% solution in DMSO at 30° C.

Determination of the melting point via melt table microscopy

Determination of the zero shear viscosity at 235° C. with a plate-plate rheometer in frequency sweep mode (rotational experiment)

Determination of the thermal stability of the polymer melt at 235° C., likewise via a rheological measurement (HAAKE Rheometer Rheostress R5150): plate-plate configuration (diameter 20 mm, gap 0.5 mm); oscillation experiment in the linear-viscoelastic range with a shear stress amplitude of 200 Pa. With this measuring device, the storage modulus G' and the loss modulus G" can likewise be determined. Recording of the storage modulus (G') and of the loss modulus (G") over 3,600 s at a frequency of 1.6 Hz enabled determination of the intersection point of both curves as a measure of the thermal stability ("sol-gel transition").

APPLICATION EXAMPLES

Comparative Example 1 (not According to the Invention) Copolymerisation of Acrylonitrile and Methylacrylate According to U.S. Pat. No. 5,618,901 in a Starved-Feed Process In an automatic reaction calorimeter RC1e by Mettler Toledo, equipped with a 500 ml double-walled jacket reactor with reflux cooling and propellor agitator, 7.6 g (6.725 ml) Calfax 16L-35 as emulsifier were dissolved in 185 g distilled water with agitation at 400 rpm. Subsequently, 0.463 g (0.545 ml)lauryl mercaptan, 5.65 g (7.05 ml) acrylonitrile and 1.0 g (1.05 ml) methylacrylate were added and made inert with N2 over 15 min. The temperature was increased to 70° C. After reaching the temperature, 0.07 g ammonium persulfate (APS) was added. Via two pump circulations, controlled via two scales, 1.385 g (1.63 ml)lauryl mercaptan, 51 g acrylonitrile and 9 g methylacrylate, on the one hand, and 0.06 g APS in 15 g water, on the other hand, are metered in at the same time over 4 h. Subsequently, the mixture is kept at 70° C. for another 30 minutes. The resulting polymer dispersion is cooled and the polymer is precipitated in 0.1% aluminium sulfate solution washed extensively with water and ethanol and dried in a vacuum at 50° C.

Figure 2:
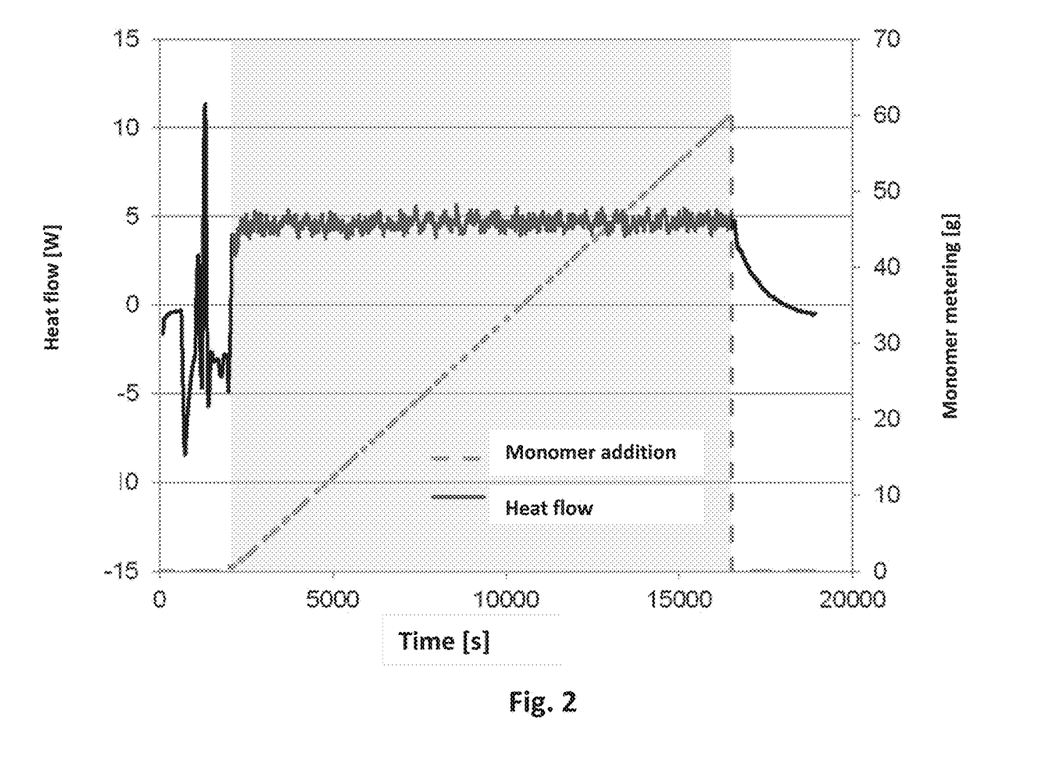
FIG. 2 depicts heat flow as a function of time in a starved-feed process. The composition of the copolymer was 9.3% by mol of methylacrylate and 90.7% by mol of acrylonitrile. The melting temperature of the copolymer was 244° C. The zero shear viscosity at 235° C. was 4,959 Pas.

The polymer had a relative viscosity of 1.58. The heat flow recorded by the RC1e had the course shown in FIG. 2 which characterises a starved-feed process.

Figure 3:
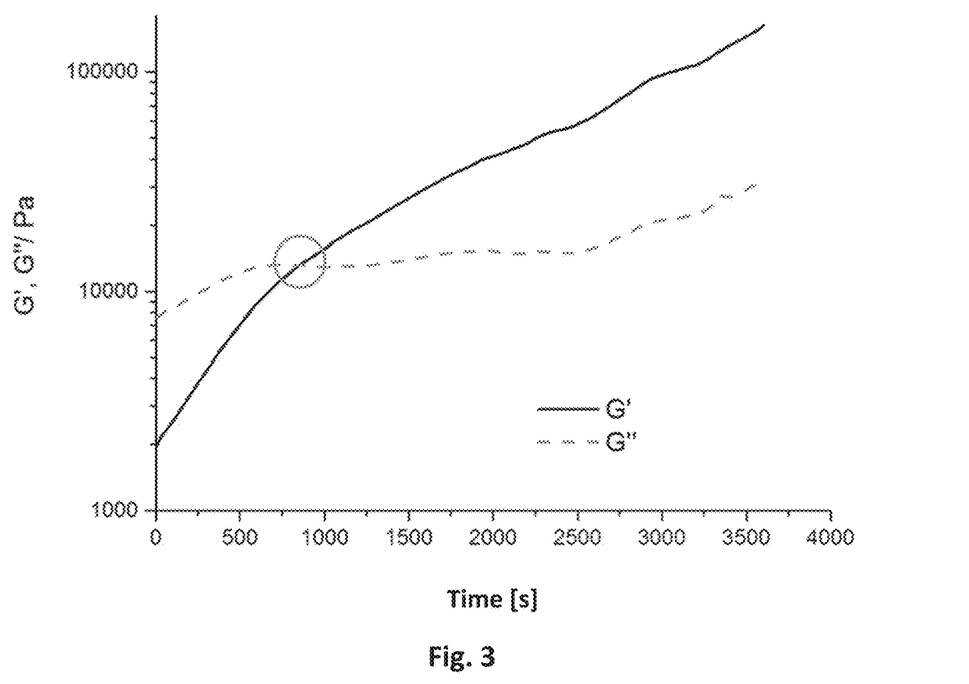
FIG. 3 depicts the G' and G" curves of the copolymer shown in FIG. 2 at 235° C. as a function of time and their intersection after 14 minutes.

The composition of the copolymer was determined at 9.3% by mol of methylacrylate and 90.7% by mol of acrylonitrile. The melting temperature of the copolymer was 244° C. The zero shear viscosity at 235° C. was 4,959 Pas. The intersection point of G' and G" at 235° C. was reached after 14 minutes, as FIG. 3 shows.

Comparative Example 2 (not According to the Invention) Copolymerisation of Acrylonitrile and Methoxyethyl Acrylate According to a Starved-Feed Process In an automatic reaction calorimeter RC1e by Mettler Toledo, equipped with a 500 ml double-walled jacket reactor with reflux cooling and propellor agitator, 7.6 g (6.725 ml) Calfax 16L-35 as emulsifier were dissolved in 185 g distilled water with agitation at 400 rpm. Subsequently, 0.439 g (0.515 ml) lauryl mercaptan, 5.36 g (6.7 ml) acrylonitrile and 1.42 g (1.4 ml) methoxyethyl acrylate were added and made inert with N2 over 15 min. The temperature was increased to 70° C. After reaching the temperature, 0.065 g ammonium persulfate (APS) was added. Via two pump circulations, controlled via two scales, 1.315 g (1.55 ml) lauryl mercaptan, 48.5 g acrylonitrile and 12.9 g methoxyethyl acrylate, on the one hand, and 0.055 g APS in 15 g water, on the other hand, are metered in at the same time over 4 h. Subsequently, the mixture is kept at 70° C. for another 30 minutes. The resulting polymer dispersion is cooled and the polymer is precipitated in 0.1% aluminium sulfate solution, washed extensively with water and ethanol and dried in a vacuum at 50° C.

Figure 4:
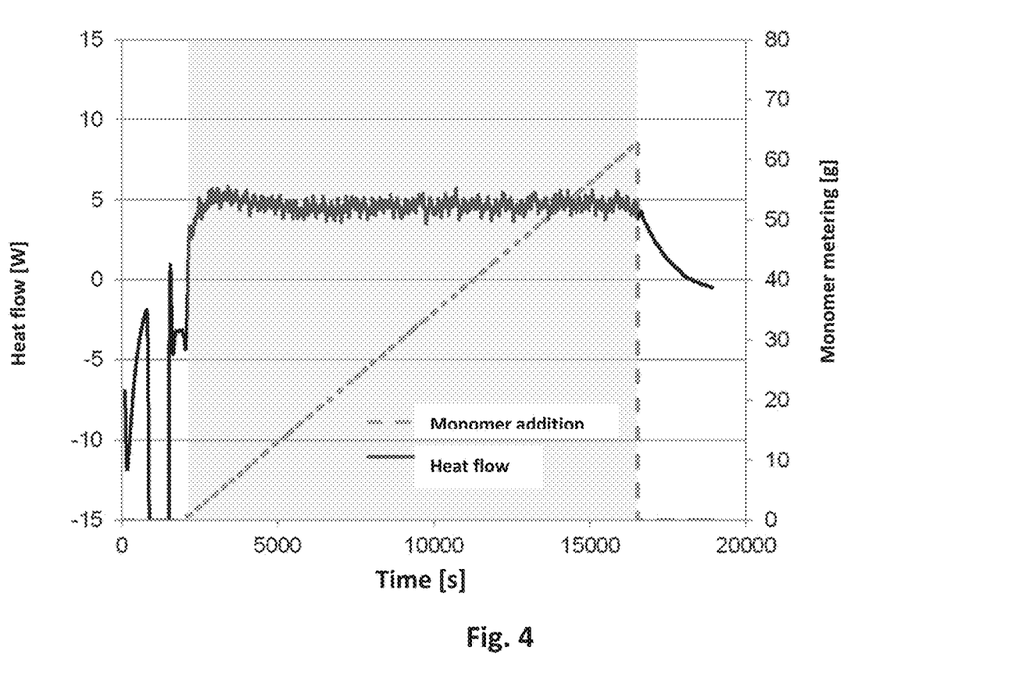
FIG. 4 depicts the heat flow as a function of time in a starved-feed process for a copolymer having 9.8% by mol of methoxyethyl acrylate and 90.2% by mol of acrylonitrile.

The polymer had a relative viscosity of 1.47. The heat flow recorded by the RC1e had the course shown in FIG. 4 which characterises a starved-feed process.

Figure 5:
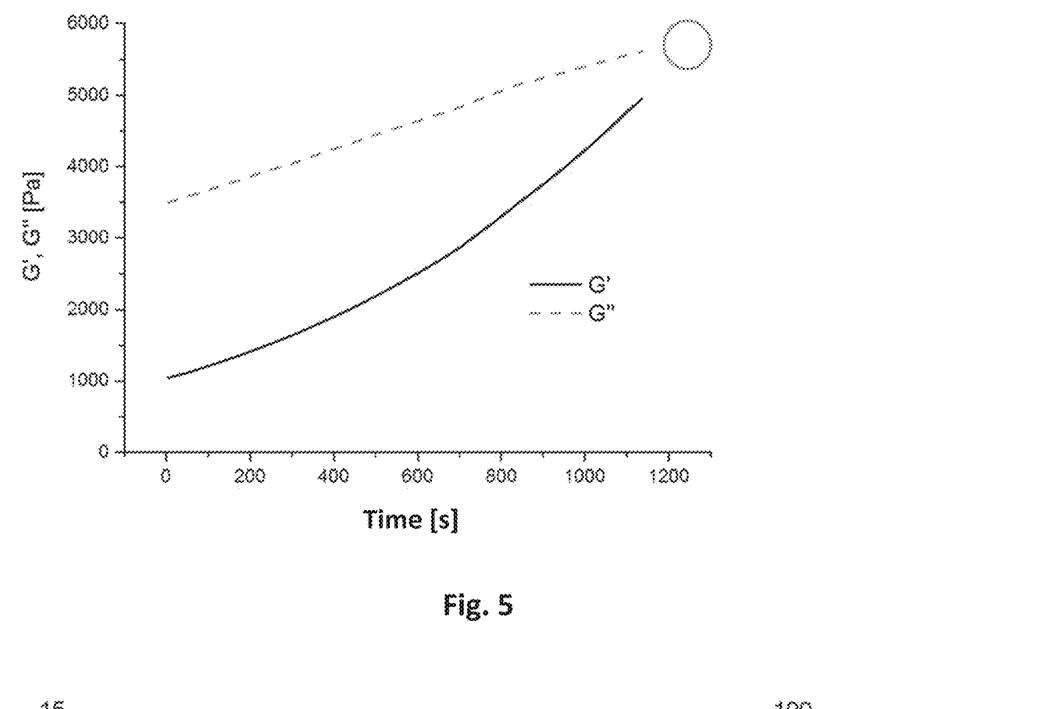
FIG. 5 depicts the G' and G" curves of the copolymer shown in FIG. 4 at 235° C. is reached after approx. 20 minutes.

The composition of the copolymer was determined at 9.8% by mol of methoxyethyl acrylate and 90.2% by mol of acrylonitrile. The melting temperature of the copolymer was 213° C. The zero shear viscosity at 235° C. was 328 Pas. The intersection point of G' and G" at 235° C. is reached after approx. 20 minutes, as FIG. 5 shows.

Comparative Example 3 (not According to the Invention, Emulsion Polymerisation with a Maximum in the Heat Flow)

In an automatic reaction calorimeter RC1 by Mettler Toledo equipped with a 1,000 ml double-walled jacket reactor with reflux cooling and anchor agitator, 3.0 g (2.655 ml) Calfax 16L-35 as emulsifier were dissolved in 370 g distilled water with agitation at 450 rpm. The solution was made inert with N2 over 15 min. The temperature was increased to 70° C. Subsequently, 0.285 g (0.269 ml) benzyl mercaptans, 37.5 g (46.8 ml) acrylonitrile, 9.96 g (9.84 ml) methoxyethyl acrylate and 0.13 g ammonium persulfate (APS) were added. After 10 min., via two pump circulations, controlled via two scales, 0.336 g (0.317 ml) benzyl mercaptan, 70.23 g acrylonitrile and 18.68 g methoxyethyl acrylate, on the one hand, and 0.11 g APS in 30 g water, on the other hand, were metered in at the same time over 1 h. Subsequently, the mixture is kept at 70° C. for another 45 minutes. The resulting polymer dispersion is cooled and the polymer is precipitated in 0.1% aluminium sulfate solution, washed extensively with water and ethanol and dried in a vacuum at 50° C.

Figure 6:
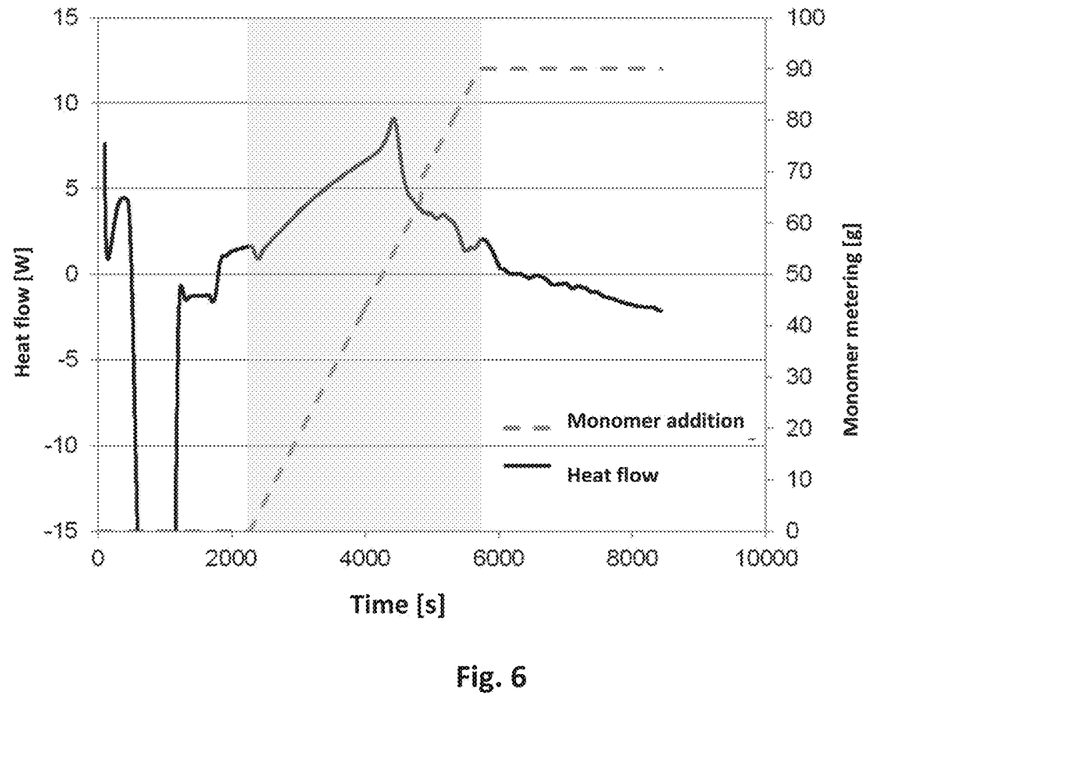
FIG. 6 depicts the heat flow and monomer metering as a function of time, which is indicative of a normal emulsion polymerisation process.

The polymer had a relative viscosity of 4.57. The heat flow recorded by the RC1 had the course shown in FIG. 6 which characterises a normal emulsion polymerisation process, in which the heat flow passes through a maximum.

The composition of the copolymer was determined at 10.0% by mol of methoxyethyl acrylate and 90.0% by mol of acrylonitrile. The polymer did not melt completely until 250° C., at higher temperatures already a discolouration via reddish to black was observed, which characterises the beginning of the cyclisation reaction in the PAN.

Embodiment 1 (According to the Invention)

In an automatic reaction calorimeter RC1e by Mettler Toledo, equipped with a 500 ml double-walled jacket reactor with reflux cooling and propellor agitator, 1.5 g (1.33 ml) Calfax 16L-35 as emulsifier were dissolved in 185 g distilled water with agitation at 400 rpm. Subsequently, 0.251 g (0.237 ml) benzyl mercaptan, 5.36 g (6.7 ml) acrylonitrile, and 1.42 g (1.4 ml) methoxyethyl acrylate were added and made inert with N2 over 15 min. The temperature was increased to 70° C., After reaching the temperature, 0.065 g ammonium persulfate (APS) was added, Via two pump circulations, controlled via two scales, 0.742 g (0.70 ml) benzyl mercaptan, 48.5 g acrylonitrile and 12.9 g methoxyethyl acrylate, on the one hand, and 0.055 g APS in 15 g water, on the other hand, are metered in at the same time over 3 h. Subsequently, the mixture is kept at 70° C. for another 30 minutes. The resulting polymer dispersion is cooled and the polymer is precipitated in 0.1% aluminium sulfate solution, washed extensively with water and ethanol and dried in a vacuum at 50° C.

Figure 7:
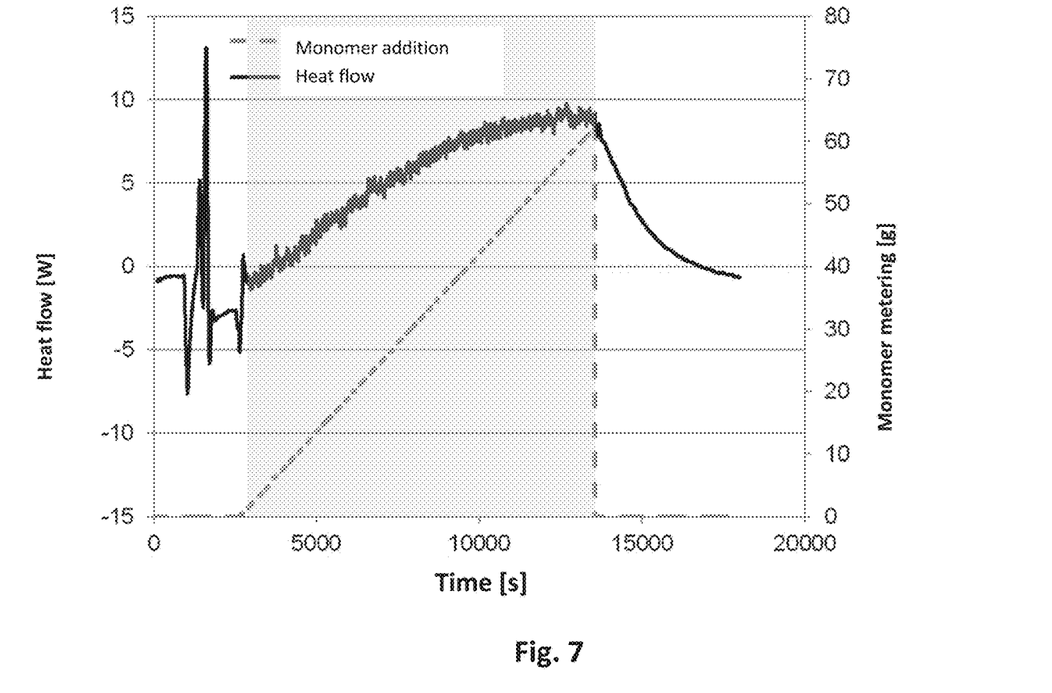
FIG. 7 depicts the heat flow and monomer metering as a function of time in a process which is characteristic of an enrichment of monomer over the metering time and a consequently-caused increase in the reaction speed over time.

The polymer had a relative viscosity of 1.46. The heat flow recorded by the RC1e had the course shown in FIG. 7 which is characteristic of an enrichment of monomer over the metering time and a consequently-caused increase in the reaction speed over time.

Figure 8:
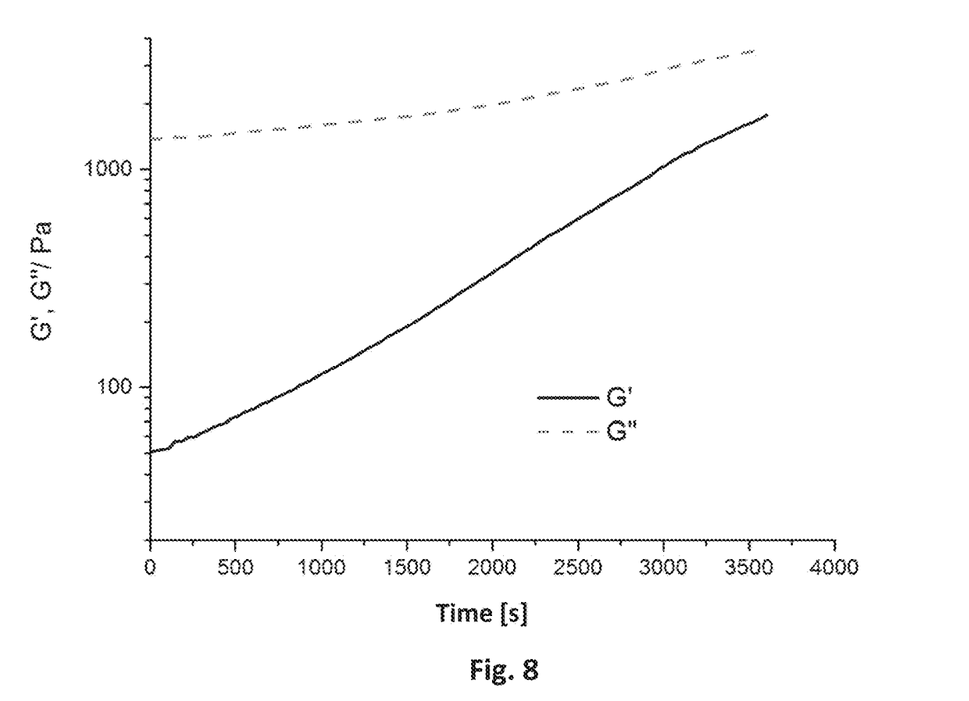
FIG. 8 depicts G' and G" as a function of time for the copolymer depicted in FIG. 7, wherein the copolymer was composed of 10.0% by mol of methoxyethyl acrylate and 90.0% by mol of acrylonitrile.

The composition of the copolymer was determined at 10.0% by mol of methoxyethyl acrylate and 90.0% by mol of acrylonitrile. The melting temperature of the copolymer was 212° C. The zero shear viscosity at 235° C. was 156 Pas. The intersection point of G' and G" at 235° C. is not reached within 60 minutes, as FIG. 8 shows.

Embodiment 2 (According to the Invention)

In an automatic reaction calorimeter RC1e by Mettler Toledo, equipped with a 500 ml double-walled jacket reactor with reflux cooling and propellor agitator, 1.5 g (1.33 ml) Calfax 16L-35 as emulsifier were dissolved in 185 g distilled water with agitation at 400 rpm. Subsequently, 0.260 g (0.46 ml) benzyl mercaptan, 5.65 g (7.05 ml) acrylonitrile and 1.00 g (1.05 ml) methylacrylate were added and made inert with N2 over 15 min. The temperature was increased to 70° C. After reaching the temperature, 0.07 g ammonium persulfate (APS) was added. Via two pump circulations, controlled via two scales, 0.769 g (0.726 ml) benzyl mercaptan, 51.0 g acrylonitrile and 9.0 g methylacrylate, on the one hand, and 0.06 g APS in 15 g water, on the other hand, are metered in at the same time over 4 h. Subsequently, the mixture is kept at 70° C. for another 30 minutes. The resulting polymer dispersion is cooled and the polymer is precipitated in 0.1% aluminium sulfate solution, washed extensively with water and ethanol and dried in a vacuum at 50° C.

Figure 9:
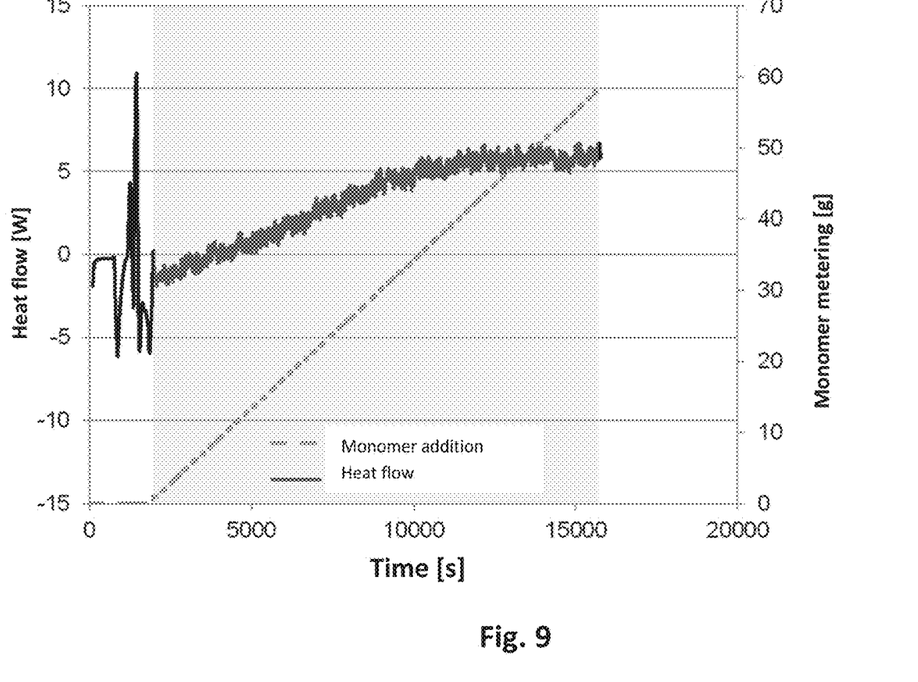
FIG. 9 depicts the heat flow as a function of time during copolymer production, which is characteristic of an enrichment of monomer over the metering time and a consequently-caused increase in the reaction speed over time.

The polymer had a relative viscosity of 1.59. The heat flow recorded by the RC1e had the course shown in FIG. 9 which is characteristic of an enrichment of monomer over the metering time and a consequently-caused increase in the reaction speed over time.

Figure 10:
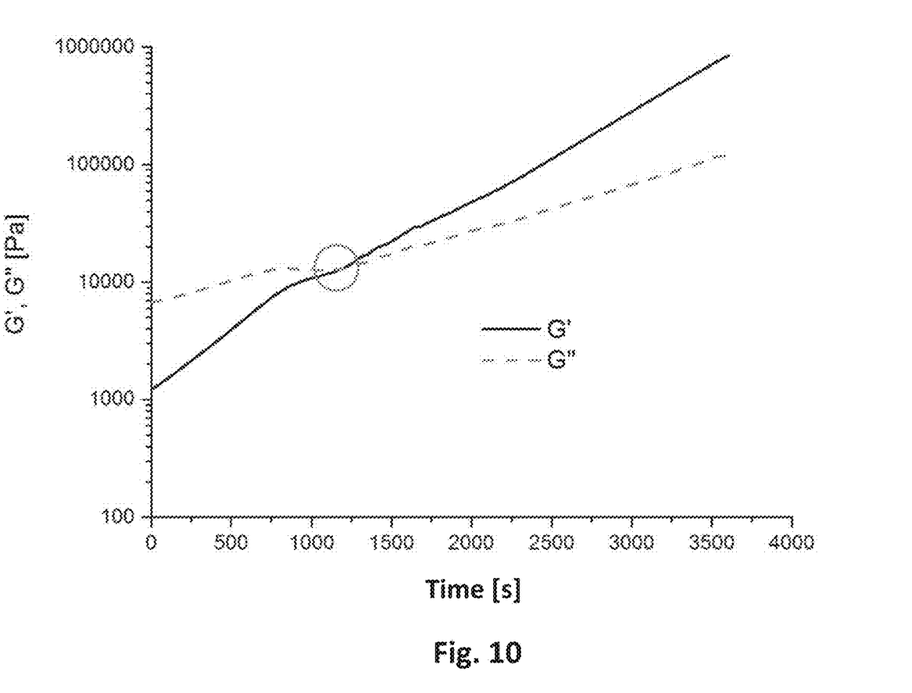
FIG. 10 depicts G' and G" as a function of time for the copolymer produced as illustrated in FIG. 9. The composition of the copolymer was determined at 9.3% by mol of methoxyethyl acrylate and 90.7% by mol of acrylonitrile.

The composition of the copolymer was determined at 9.3% by mol of methoxyethyl acrylate and 90.7% by mol of acrylonitrile. The melting temperature of the copolymer was 216° C. and hence is below that of the copolymer described in comparative example 1 by almost 30° C. The zero shear viscosity at 235° C. was 773 Pas and hence was less than in comparative example 1 by the factor 6. The intersection point of G' and G" at 235° C. is reached within 20 minutes and hence is reached later than in comparative example 1 by 30%, as FIG. 10 shows.

Embodiment 3 (According to the Invention)

In an automatic reaction calorimeter RC1e by Mettler Toledo, equipped with a 500 ml double-walled jacket reactor with reflux cooling and propellor agitator, 1.5 g (1.33 ml) Calfax 16L-35 as emulsifier were dissolved in 185 g distilled water with agitation at 400 rpm. Subsequently, 0.596 g (0.562 ml) benzyl mercaptan, 5.36 g (6.7 ml) acrylonitrile and 1.42 g (1.4 ml) methoxyethyl acrylate were added and made inert with N2 over 15 min. The temperature was increased to 70° C. After reaching the temperature, 0.065 g ammonium persulfate (APS) was added. Via two pump circulations, controlled via two scales, 0.397 g (0.375 ml) benzyl mercaptan, 48.5 g acrylonitrile and 12.9 g methoxyethyl acrylate, on the one hand, and 0.055 g APS in 15 g water, on the other hand, are metered in at the same time over 4 h, Subsequently, the mixture is kept at 70° C. for another 30 minutes. The resulting polymer dispersion is cooled and the polymer is precipitated in 0.1% aluminium sulfate solution, washed extensively with water and ethanol and dried in a vacuum at 50° C.

Figure 11:
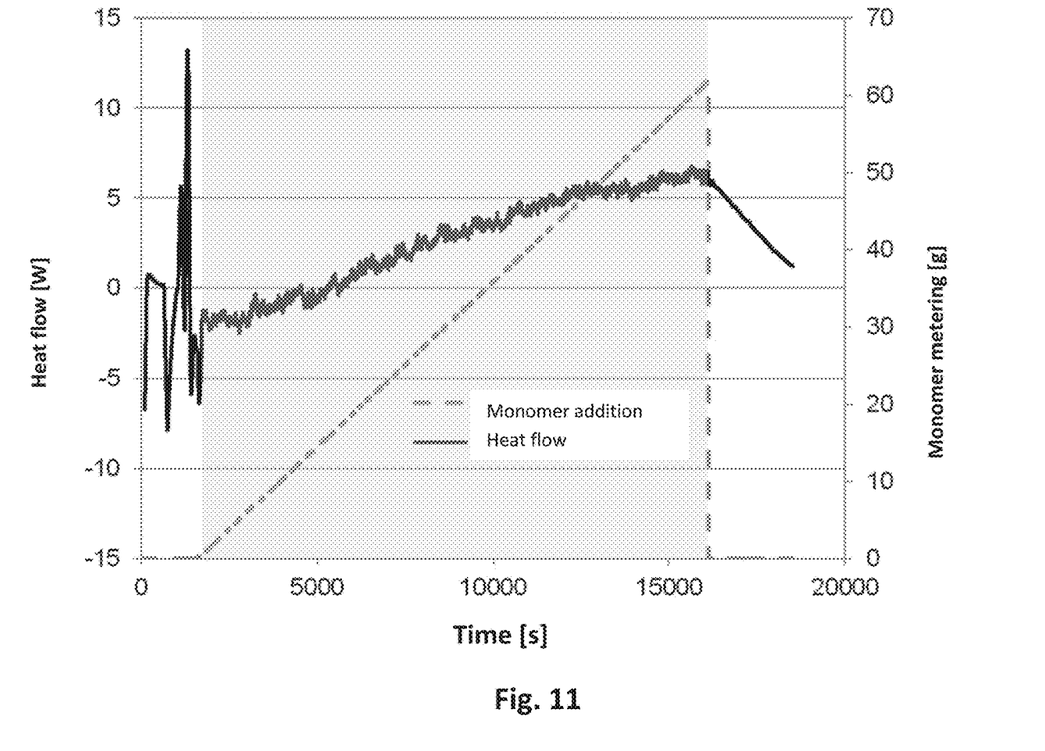
FIG. 11 depicts the heat flow and monomer metering as a function of time in another polymer synthesis. The polymer had a relative viscosity of 1.73. The heat flow indicates an enrichment of monomer over the metering time and a consequently-caused increase in the reaction speed over time.

The polymer had a relative viscosity of 1.73. The heat flow recorded by the RC1e had the course shown in FIG. 11 which is characteristic of an enrichment of monomer over the metering time and a consequently-caused increase in the reaction speed over time.

Figure 12:
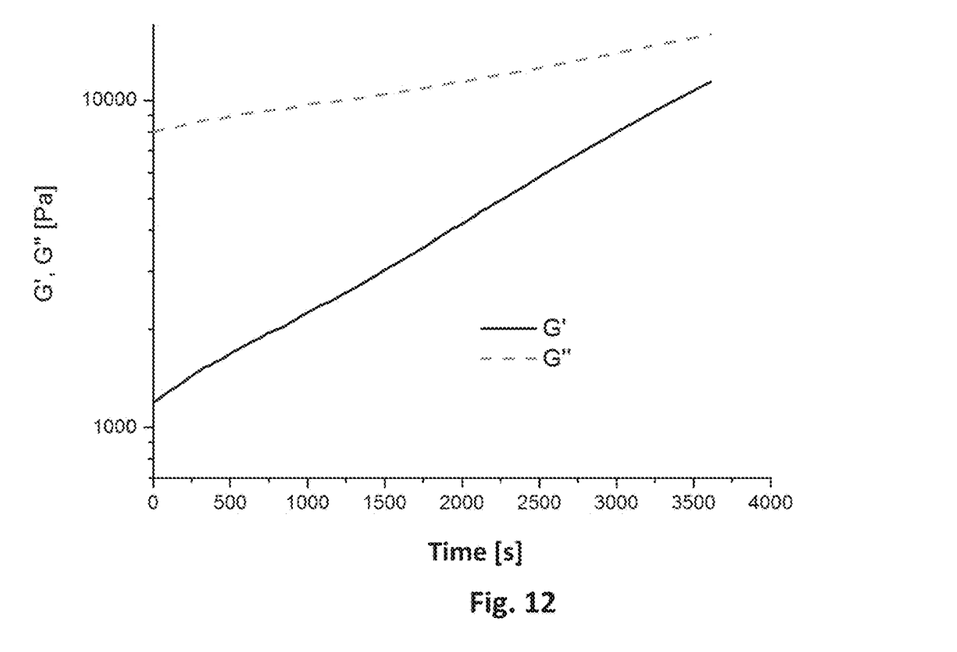
FIG. 12 depicts G' and G" as a function of time for the copolymer illustrated in FIG. 11. The composition of the copolymer was determined at 9.9% by mol of methoxyethyl acrylate and 90.1% by mol of acrylonitrile.

The composition of the copolymer was determined at 9.9% by mol of methoxyethyl acrylate and 90.1% by mol of acrylonitrile. The melting temperature of the copolymer was 208° C. The zero shear viscosity at 235° C. was 950 Pas. The intersection point of G' and G" at 235° C. is not reached within 60 minutes, as FIG. 12 shows.

The polymer was spun at a temperature of 220° C. with a withdrawal speed of 400 m/min. A monofilament with a titre of 9.6 tex was produced. The modulus of the monofilament was 424.2 cN/tex, the strength 9.4 cN/tex and the breaking elongation 28.6%.

Embodiment 4 (According to the Invention)

In an automatic reaction calorimeter RC1e by Mettler Toledo, equipped with a 500 ml double-walled jacket reactor with reflux cooling and propellor agitator, 1.5 g (1.33 ml) Calfax 16L-35 as emulsifier were dissolved in 185 g distilled water with agitation at 400 rpm. Subsequently, 0.645 g (0,609 ml) benzyl mercaptan, 5.36 g (6.7 ml) acrylonitrile, and 1.42 g (1.4 ml) methoxyethyl acrylate were added and made inert with N2 over 15 min. The temperature was increased to 70° C. After reaching the temperature, 0.065 g ammonium persulfate (APS) was added. Via two pump circulations, controlled via two scales, 0.347 g (0.328 ml) benzyl mercaptan, 48.5 g acrylonitrile and 12.9 g methoxyethyl acrylate, on the one hand, and 0.055 g APS in 15 g water, on the other hand, are metered in at the same time over 4 h. Subsequently, the mixture is kept at 70° C. for another 30 minutes. The resulting polymer dispersion is cooled and the polymer is precipitated in 0.1% aluminium sulfate solution, washed extensively with water and ethanol and dried in a vacuum at 50° C.

Figure 13:
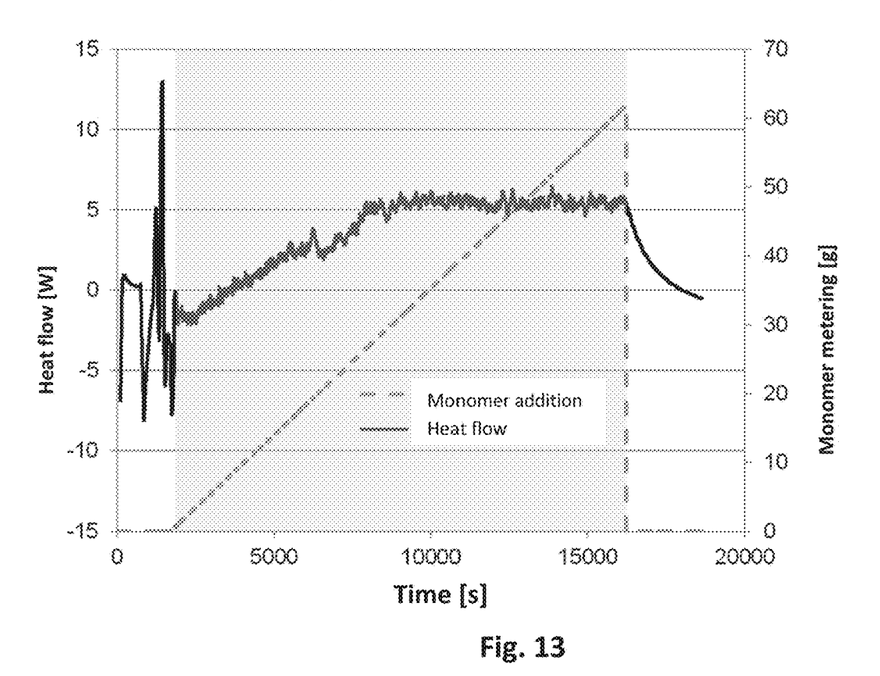
FIG. 13 depicts heat flow as a function of metering time of the monomer and a consequently-caused increase in the reaction speed over time in yet another polymer synthesis.

The polymer had a relative viscosity of 1.82. The heat flow recorded by the RC1e had the course shown in FIG. 13 which is characteristic of an enrichment of monomer over the metering time and a consequently-caused increase in the reaction speed over time.

Figure 14:
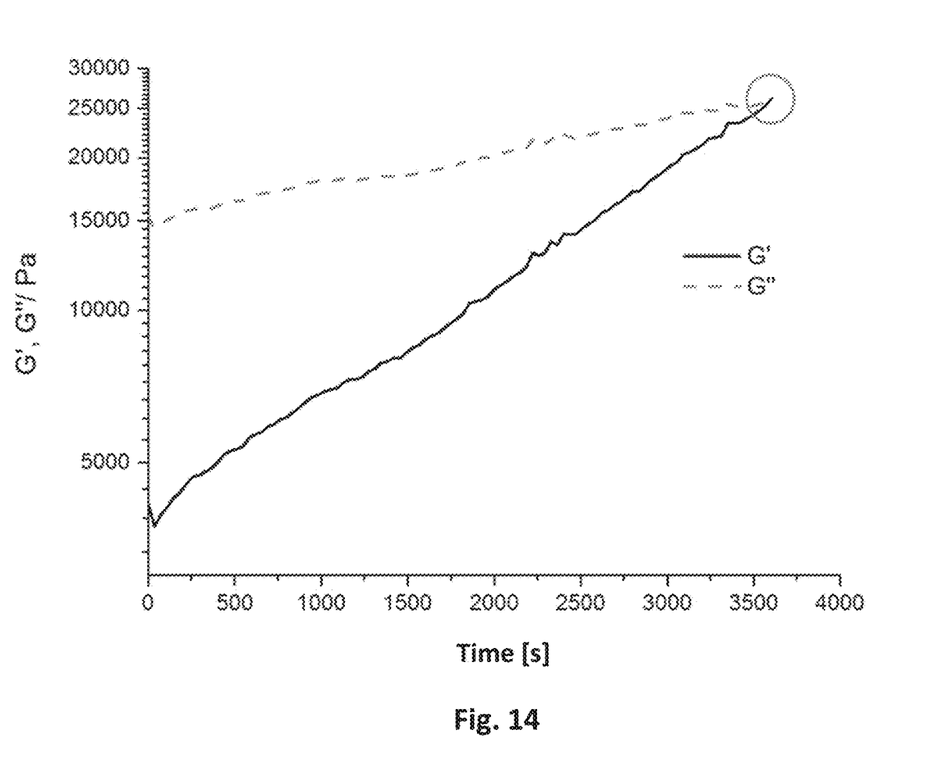
FIG. 14 depicts G' and G" as a function of time for the copolymer illustrated in FIG. 13 and having a composition of 9.5% by mol of methoxyethyl acrylate and 90.5% by mol of acrylonitrile.

The composition of the copolymer was determined at 9.5% by mol of methoxyethyl acrylate and 90.5% by mol of acrylonitrile. The melting temperature of the copolymer was 212° C. The zero shear viscosity at 235° C. was 2,376 Pas. The intersection point of G' and G" at 235° C. is reached after 60 minutes, as FIG. 14 shows.

Embodiment 5 (According to the Invention)

In an automatic reaction calorimeter RC1e by Mettler Toledo, equipped with a 500 ml double-walled jacket reactor with reflux cooling and propellor agitator, 1.5 g (1.33 ml) Calfax 16L-35 as emulsifier were dissolved in 185 g distilled water with agitation at 400 rpm. Subsequently, 0.742 g (0.70 ml) benzyl mercaptan, 5.36 g (6.7 ml) acrylonitrile and 1.42 g (1.4 ml) methoxyethyl acrylate were added and made inert with N2 over 15 min. The temperature was increased to 70° C. After reaching the temperature, 0.065 g ammonium persulfate (APS) was added. Via two pump circulations, controlled via two scales, 0.251 g (0.237 ml) benzyl mercaptan, 48.5 g acrylonitrile and 12.9 g methoxyethyl acrylate, on the one hand, and 0.055 g APS in 15 g water, on the other hand, are metered in at the same time over 4 h, Subsequently, the mixture is kept at 70° C. for another 30 minutes. The resulting polymer dispersion is cooled and the polymer is precipitated in 0.1% aluminium sulfate solution, washed extensively with water and ethanol and dried in a vacuum at 50° C.

Figure 15:
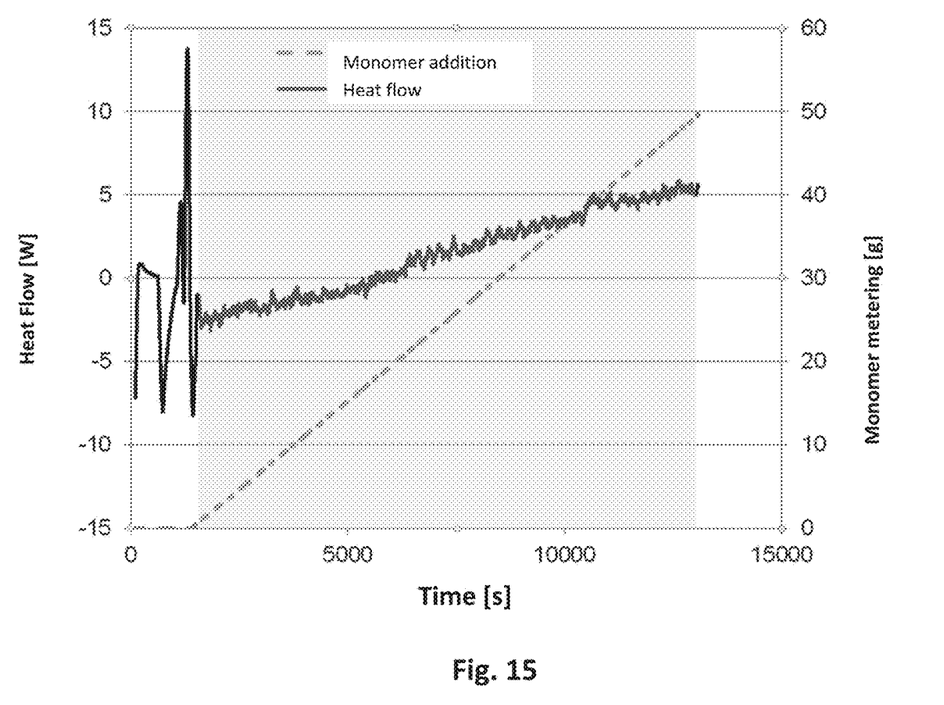
FIG. 15 depicts the heat flow as a function of the metering time of the monomer and a consequently-caused increase in the reaction speed over time in still another polymer synthesis.

The polymer had a relative viscosity of 1.96. The heat flow recorded by the RC1e had the course shown in FIG. 15 which is characteristic of an enrichment of monomer over the metering time and a consequently-caused increase in the reaction speed over time.

Figure 16:
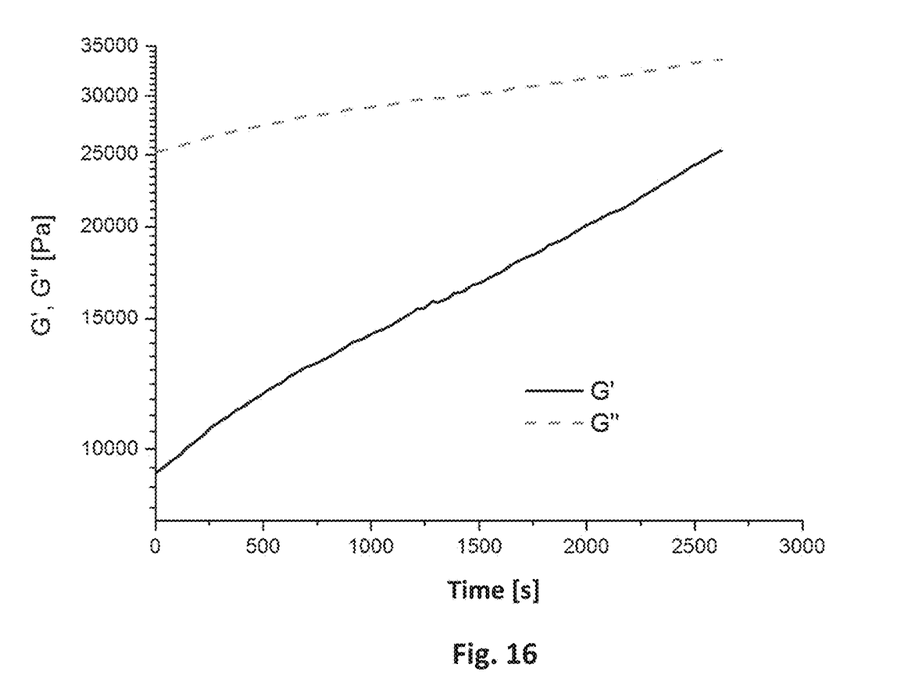
FIG. 16 depicts G' and G" as a function of time for the copolymer illustrated in FIG. 15 and having a composition of 10.2% by mol of methoxyethyl acrylate and 89.8% by mol of acrylonitrile.

The composition of the copolymer was determined at 10.2% by mol of methoxyethyl acrylate and 89.8% by mol of acrylonitrile. The melting temperature of the copolymer was 215° C. The zero shear viscosity at 235° C. was 3,783 Pas. The intersection point of G' and G" at 235° C. is not reached within 60 minutes, as FIG. 16 shows.

The polymer was spun at a temperature of 240° C. with a withdrawal speed of 200 m/min. A monofilament with a titre of 18.8 tex was produced. The modulus of the monofilament was 346 cN/tex, the strength 9.2 cN/tex and the breaking elongation 35.0%.

The implemented test series show that—relative to the process of emulsion polymerisation—the controlled deviation from the starved-feed process, compared both to a starved-feed process and to a process with too rapid a monomer metered addition (peak in the heat flow), led to improved properties of the resulting polymer. However, the cause of this behaviour is extensively unclear and can only be attributed to the special method control.

The invention claimed is:

1. A polyacrylonitrile (PAN) copolymer, wherein a sol-gel transition, measured by means of an intersection point of the temporal courses of the storage modulus G' and of the loss modulus G" determined in a rheological oscillation experiment with a plate-plate configuration (diameter 20 mm, gap 0.5 mm) with a shear stress amplitude of 200 Pa, at a frequency of 1.6 Hz and a temperature of 235° C.,
which is at least 30% greater, compared to an identical polyacrylonitrile copolymer, produced according to a starved-feed method and/or the sol-gel transition takes place after at least 1,200 s.

2. A moulded article comprising the polyacrylonitrile copolymer according to claim 1.

3. A method for producing a moulded article comprising polyacrylonitrile filaments comprising melt-spinning the polyacrylonitrile copolymer according to claim 1 into a melt-spun mono or multifilament.

4. A method for the producing the PAN copolymer according to claim 1, comprising conducting radical copolymerisation of at least one acrylonitrile monomer and at least one radically polymerisable comonomer,
wherein an initial mixture comprising at least one acrylonitrile monomer and at least one radically polymerisable comonomer is provided,
a radical polymerisation reaction is initiated, and
wherein, before, during and/or after initiation, a mixture comprising the at least one acrylonitrile monomer and the at least one radically polymerisable comonomer is added to the initial mixture so that the speed of the radical polymerisation reaction and/or the heat flow released during the radical polymerisation is continuously increasing, intermittently or continuously, over the entire period of time of the addition, and without decreasing.

5. The method according to claim 4, in which the speed of the radical polymerisation reaction and/or the heat flow released during the radical polymerisation is continuously increased over the entire period of time of the addition or is continuously increased, at least or precisely over a first part of the period of time of the addition and is kept constant in at least or precisely a further part, wherein the first part of the period of time constitutes at least 30% of the total period of time of the addition.

6. The method according to claim 4, wherein the initial mixture and/or the added mixture comprises
a) acrylonitrile, methacrylonitrile, or mixtures thereof and/or
b) the at least one radically polymerisable comonomer, at least one alkoxy alkyl acrylate, alkyl acrylate, vinyl ester, styrene, substituted styrenes, acrylamide, N-substituted acrylamides, N,N-annularly substituted acrylamides, N-substituted N-vinyl amides, N,N-annularly substituted N-vinyl amides, acid-containing monomers, ionic monomers, or mixtures of at least two of the above-mentioned compounds.

7. The method according to claim 4, wherein the initial mixture and/or the added mixture comprises
a) 95 to 80% by mol of acrylonitrile monomer and
b) at least one comonomer selected from
   i) 5 to 20% by mol of at least one alkoxy alkyl acrylate of the general formula I with $R=C_nH_{2n+1}$ and n=1-8 and m=1-8,
   ii) 0 to 10% by mol of at least one alkyl acrylate of the general formula II with $R'=C_nH_{2n+1}$ and n=1-18, and
   iii) 0 to 10% by mol of at least one vinyl ester of the general formula III with $R=C_nH_{2n+1}$ and n=1 18,
relative to the totality of acrylonitrile monomers and copolymers or, with respect to the at least one acrylonitrile monomer and to the at least one radically polymerisable comonomer.

8. The method according to claim 4, wherein the initial mixture and/or the added mixture comprises at least one solvent in which the at least one acrylonitrile monomer and the at least one comonomer is soluble or dispersible,
- the at least one solvent is selected from the group consisting of water, alcohols, and mixtures thereof, and/or
- the content of the at least one solvent in the initial mixture is from 80 to 99.9% by weight.

9. The method according to claim 4, wherein the initial mixture and/or the added mixture comprises at least one emulsifier, wherein the at least one emulsifier is selected from the group consisting of alkyl sulfonates, alkyl sulfates, aralkyl sulfonates, aralkyl carboxylates, acrylosulfonates, fatty acid soaps, and resin soaps, and/or is contained in a quantity of 0.001 to 5% by weight relative to the initial mixture or the metered-in mixture.

10. The method according to claim 4, wherein the initial mixture and/or the added mixture comprises at least one chain-transferring substance, wherein the at least one chain-transferring substance is selected from the group consisting of mercaptans, monofunctional alkyl mercaptans, multifunctional alkyl mercaptans, disulfides and mixtures or combinations thereof, and/or is contained in a quantity of 0.001 to 2% by weight relative to the initial mixture or the added mixture.

11. The method according to claim 4, wherein the polymerisation reaction is initiated chemically, thermally or by means of irradiation, by the addition of a radical starter to the initial mixture and/or to the added mixture.

12. The method according to claim 4, wherein the added mixture is added separately into the initial mixture,
- a first part of the added mixture comprising the at least one acrylonitrile monomer which comprises at least one comonomer and at least one chain-transferring substance or consists thereof, and
- a second part comprising at least one solvent and at least one radical starter or consisting thereof.

13. The method according to claim 4, wherein the radical polymerisation is implemented as an emulsion polymerisation.

* * * * *